Oct. 22, 1935.                 H. J. CRINER                    2,018,121
                           BREAD SLICING MACHINE
                         Filed April 26, 1934          3 Sheets-Sheet 2
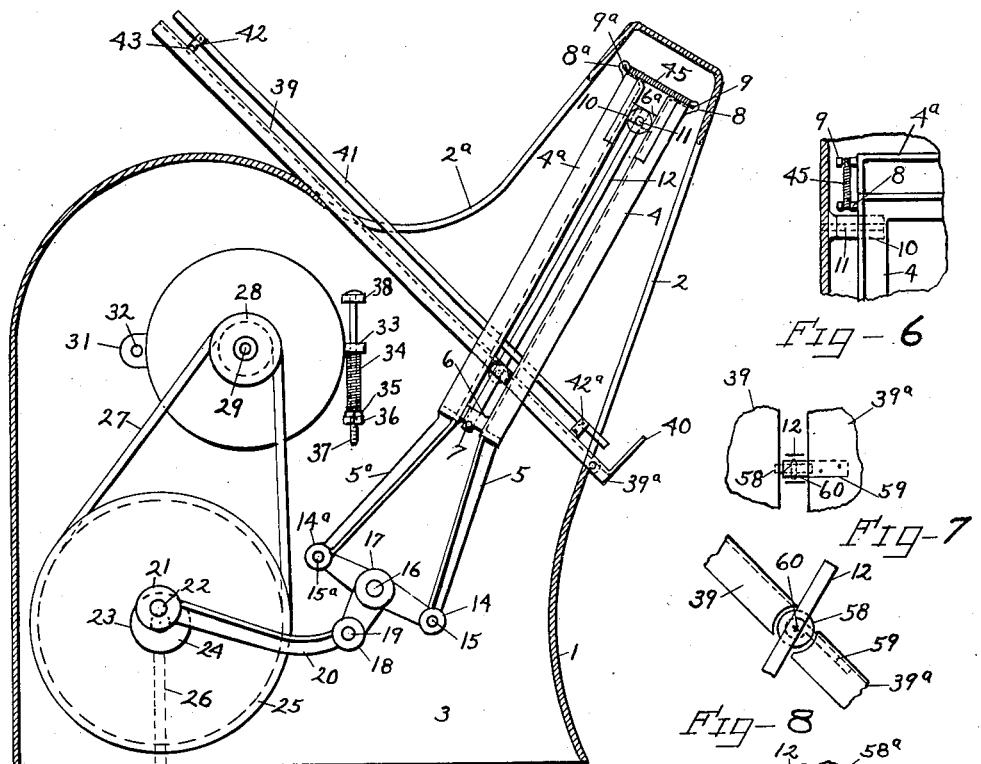
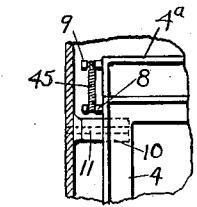
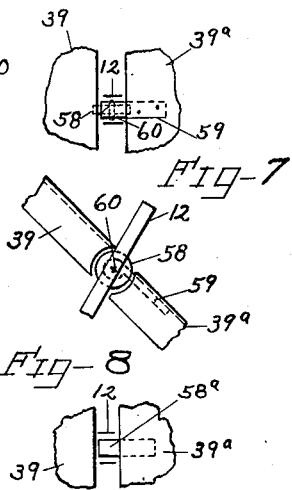
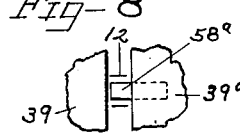
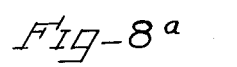
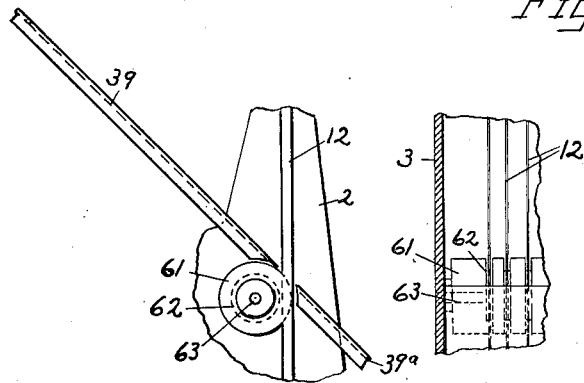
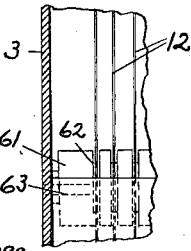
INVENTOR.
Harry J. Criner,
BY Bush & Bush,
ATTORNEYS.

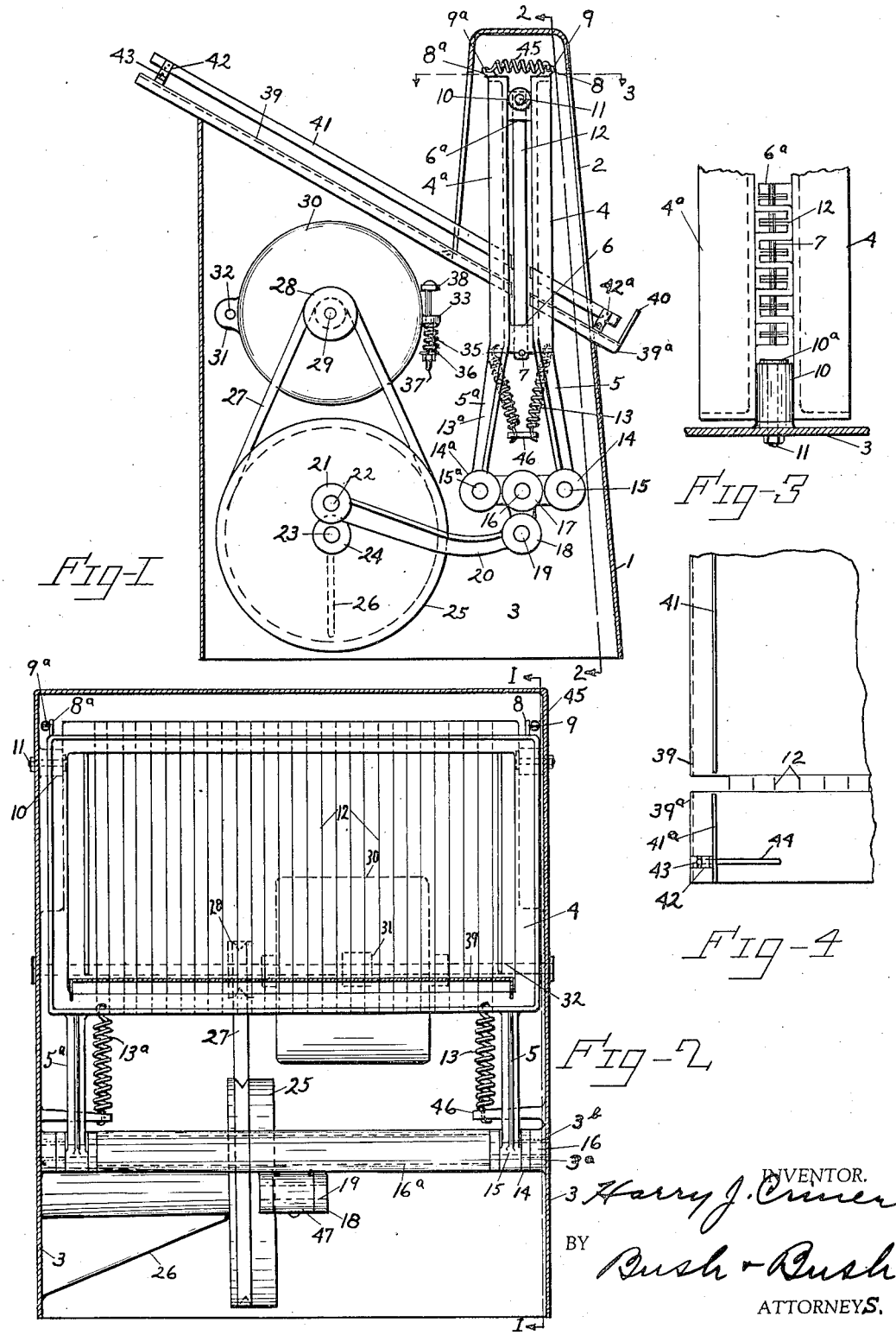

Oct. 22, 1935.    H. J. CRINER    2,018,121
BREAD SLICING MACHINE
Filed April 26, 1934    3 Sheets-Sheet 3
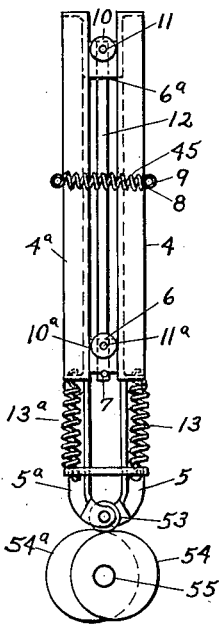
Fig-13
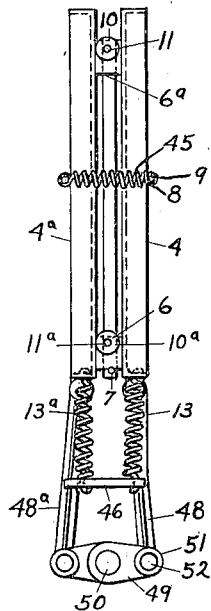
Fig-14
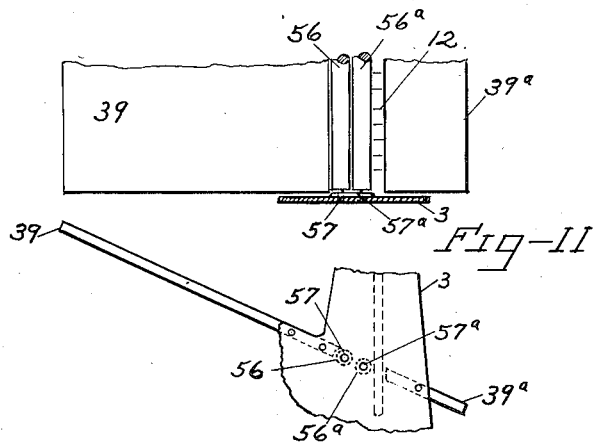
Fig-11
Fig-12
INVENTOR.
Harry J. Criner,
BY
Bush & Bush,
ATTORNEYS.

Patented Oct. 22, 1935

2,018,121

UNITED STATES PATENT OFFICE 2,018,121

BREAD SLICING MACHINE

Harry J. Criner, Davenport, Iowa, assignor of one-half to A. G. Bush, Davenport, Iowa Application April 26, 1934, Serial No. 722,459

17 Claims. (Cl. 146—153)

My invention relates to bread slicing machines in which alternating series of reciprocating blades are utilized to slice the bread. These series of blades are frequently set in oppositely moving frames and when frames are thus utilized considerable difficulty arises from vibration caused by the reciprocating frames.

The objects of my invention are:

To provide a simple, efficient, high speed slicing machine having the blades mounted in reciprocating frames with means to reduce the amount of vibration. Other objects will appear from the following description.

I accomplish these objects by the mechanism shown in the accompanying drawings, in which,—

Figure 1 shows a vertical section on the line 1—1 of Figure 2;

Figure 2 is a vertical section on the line 2—2 of Figure 1;

Figure 3 is an enlarged sectional detail on the line 3—3 of Figure 1;

Figure 4 is an enlarged detail of a portion of the bread chute showing the gap between the upper and lower sections;

Figure 5 is a vertical section of an alternate preferred form of my machine in which the cutting blades instead of being mounted to travel vertically are mounted so as to travel substantially at or near a right angle to the bread chute;

Figure 6 is a detail showing a part of the frames, 4 and 4a, in their upper and lower positions respectively;

Figures 7 and 8 are details showing the supporting rolls attached to the bread chute;

Figure 8a is a detail of an alternate form showing a spring support in place of the roll;

Figures 9 and 10 are details showing a long roll extending transversely of the machine to support the bread as it passes through the blades and having circumferential slots through which the blades can travel;

Figures 11 and 12 are details of an alternate form showing booster rolls at the lower end of the upper section of the bread chute to facilitate the movement of the bread through the cutting blades;

Figures 13 and 14 are detail side views of the frames with an alternate form of guide spring and Figure 13 shows the frames driven by a cam and roller in place of by rocker arms.

Several numerals refer to similar parts throughout the several views.

My machine comprises a housing, 1, consisting of side, end and top pieces preferably cast integral and having an upward extension to cover the blades which extension is provided with front and rear openings, 2 and 2a, through which the bread chute carries the bread before and after slicing. For convenience, I refer to the right of Figures 1 and 5 as the front of the machine and to the left of Figures 1 and 5 as the rear.

The housing may be formed solid or with suitable handholes to facilitate mounting and adjusting the machine as desired. In the lower part of the housing, I form bearing bosses, 3a, integral with the sides of the housing, which may be provided with oil-less bushings, 3b, in which pivot pins, 16, are mounted, being inserted through suitable openings formed in the side walls, 3.

Upon these pins, 16, I rigidly mount the rocker assembly which is preferably cast integral, comprising a hollow tubular shaft, 16a, upon each end of which rocker arms, 17, are formed.

Each rocker arm has a hub or boss, 14 and 14a, at its outer ends and a short arm with a boss, 18, extends downwardly from the middle of the shaft, 16a, to which a link, 20, is pivotally united. One end of the link, 20, is mounted upon a crank pin, 22, carried by a drive wheel, 25, which is driven by a belt, 27, the belt, 27, passing around and being driven by a belt pulley, 28, upon the motor shaft, 29. The drive shaft, 24, is mounted in a suitable bearing formed integral with a bracket or rib, 26, which projects inwardly from one of the side walls, 3, of the housing.

The motor is preferably supported on a crossbar, 32, which extends transversely of the rear of the housing, by lugs, 31, and the front of the motor is resiliently mounted upon a lug, or bracket, 38, which may be cast integral with the housing or otherwise suitably supported.

A lug, 33, is cast integral with the motor housing and through it extends a bolt, 37, carrying a nut, 36, with a spring, 34, interposed between the nut, 36, and the lug, 33, whereby the belt may be tightened or adjusted and the spring, 34, will automatically act to keep the belt taut within the limits of its travel.

In the bosses, 14 and 14a, at the ends of the rocker arms, I mount pivots, 15 and 15a, to drive the blade frames. The blade frames are formed in rectangular form of light metal so as to reduce vibration. To the lower ends of the blade frames, 4 and 4a, I unite downward extensions, 5 and 5a, which may be cast integral with the frames, or otherwise suitably secured thereto. The lower ends of these extensions carry bosses 14 and 14a, which are pivotally mounted upon the pivots, 15 and 15a. The frames, 4 and 4a, respectively, have series of cutting blades, 12, which may be mounted therein in any suitable manner, but I prefer to mount them by forming lugs, 6, upon the lower crossbars of the frames, and lugs, 6a, upon the upper crossbars of the frames which extend inwardly from the opposite frames. These lugs are preferably slotted and the ends of the blades, 12, are secured therein by pivot pins, 7.

In order to guide the upper ends of the blade frames, I form upwardly extending lugs, 8 and 8a, on the frames respectively and unite same by a tension spring, 45, secured in lugs by pins, 9 and 9a.

Between the upper ends of the frame at each end thereof, I mount a roll, 10, upon a pin, 11, which is suitably united to the side housing in a boss or other suitable support.

These rolls may be plain as shown or they may be formed with a flange to prevent side play of the frames, although when the bosses, 14, are made of sufficient length, they will be sufficient to restrain side play in the frames without any additional means for that purpose.

The faces of the blade frames adjacent the rolls, are preferably ground to form a smooth face and the rolls, 10, may be of any desired metal or composition best adapted for the purpose.

In order to cushion the alternate starting and stopping of the frames with each reciprocation and to take up any slack that might come from wear of the pins, 15, or other bearings, I form a lower lug, 46, on the inside of each side plate and form a corresponding lug or means of attachment to each blade frame at each end thereof.

Resilient means such as coiled tension springs, 13 and 13a, have their lower ends mounted in the lugs, 46, and their upper ends mounted in the blade frames so as to exert a constant tension downwardly upon the frames, the springs being so proportioned and adjusted as to apply this downward tension at all times, thus keeping the hubs on the extensions of the blade frames in constant contact with the pins, 15 and 15a, and preventing any hammering such as would occur after the pins or bearings become slightly worn.

It is obvious that the spring tension upon the frames may be applied to act either in a downward or upward direction as desired, the effect being substantially the same so far as obviating vibration is concerned. Likewise, this force may be applied by tension springs such as I have shown or by compression springs and I do not limit my claims to the precise form of springs shown nor to the use of springs at all, as equivalent resilient means may be mounted in the machine to exert continuous downward or upward pressure on the frames that will hold them in close contact with the pins, 15 and 15a, without departing from the spirit of my invention.

In Figure 14 I have shown the guide springs, 45, secured to the blade "frames near the middle thereof and with additional rolls, 10a, mounted upon pins, 11a, interposed between the frames near the lower end thereof, but I prefer to utilize only the upper rolls, 10.

In Figure 13, I have shown an alternate form of driving mechanism for the blade frames, showing the extensions, 5 and 5a, being formed with yokes at their lower ends carrying rolls, 53, with a double cam, 54 and 54a, mounted upon a shaft, 55, to drive the blade frames.

The detent springs, 13 and 13a, may be mounted in parallel with the frames as shown in Figure 14, or they may be inclined inwardly toward the bottom as shown in Figure 1 so as to exert an additional tension inwardly upon the frames.

Upon the rear portion of the housing, I mount the rear section, 39, of a bread chute sloping downwardly to the cutting blades. I prefer to use very narrow cutting blades, approximately three sixty-fourths of an inch in width, and to permit the passage of these cutting blades, I form my bread chute in two sections, the lower section, 39a, sloping downwardly from the cutting blades.

Lateral guides, 41, may be mounted upon the bread chute on brackets, 42 and 42a, respectively, which are adjustable in slots, 44, formed in the sections of the bread chute and adjusted with adjusting nuts, 43.

With narrow blades such as I have described, the machine will usually work satisfactorily without any additional support for the bread between the blades, as the gap only needs to be less than half an inch wide. However, additional support may be given to the slices of bread while passing through the blades by narrow, individual rolls, 58, mounted upon spring fingers, 59, riveted to one of the sections of the bread chute as shown in Figure 8, or a long roll, 61, may be mounted transversely of the bread chute upon a shaft or pivot, 63, having annular grooves, 62, cut therein at the proper intervals to accommodate the cutting blades.

The roll, 61, may be free to roll with the bread or may be driven by any suitable means, if desired to accelerate the bread at this point. Similarly, booster rolls, 56 and 56a, mounted upon pivots, 57 and 57a, may be utilized to accelerate the movement of the bread from the upper section of the bread chute to the cutting blades, if desired.

In practice, I prefer to mount the upper edge of the lower section of the bread chute, 39a, slightly below the line of the upper surface of the upper section of the bread chute, 39, as that will facilitate the passage of the bread thereto.

An important feature of my invention is that it can be made to provide means for quickly adapting the machine to cut slices of various thicknesses.

The frames are so attached to the rocker arms that they can be quickly and readily removed and other frames having the blades differently spaced, substituted.

When the bread supports, 58, 61 and 56, are omitted, no change will have to be made in the bread chute, but when the lower section of the bread chute is provided with the rolls, 58, or the spring fingers, 58a, an entire section having these rolls spaced to conform to the substituted frames may be readily substituted. Likewise, the roll, 61, may be replaced by another roll with annular slots spaced to fit the blades in such substituted frames.

In order to facilitate such changes, either one or both sections of the bread chute may be mounted in a way to be easily detachable from the housing.

I prefer to mount the upper section, 39, rigidly and the lower section, 39a, easily removable.

In the operation of my machine, the machine the machine is assembled as described and the bread to be sliced is then placed upon the upper section, 39, of the bread chute either manually or by any desired mechanical means. The slope of the bread chute will cause the bread to descend by gravity to the slicing blades which will then slice the bread after which it passes to the lower section 39a, of the bread chute where it may be held by the detent, 40, or led to the wrapping machine or otherwise disposed of as desired.

I do not limit my claims to the precise construction shown as it is obvious that various modifications may be made without departing from the spirit of my invention. Likewise I do not limit my claims to any precise forms of driving mechanism, for it is obvious that the blade frames may be driven by rocker arms, cams or connecting rod links or other well known driving means.

I claim:

1. A bread slicing machine comprising a housing, a pair of rectangular frames mounted therein, each frame having a series of slicing blades mounted therein, guide rolls pivotally mounted within the housing and extending between the rectangular frames, resilient means attached to the frames adapted to exert a constant traction thereon towards each other, operative means connected to the frames adapted to drive them reciprocatingly in alternation and means to feed the bread to the slicing blades.

2. A bread slicing machine comprising a housing, a pair of rectangular frames mounted therein, each frame having a series of slicing blades mounted therein with the cutting edges of the blades adapted to travel substantially in a single plane, guide rolls pivotally mounted within the housing and extending between the rectangular frames, resilient means attached to the frames adapted to exert a constant traction thereon towards each other, operative means connected to the frames adapted to drive them reciprocatingly in alternation and means to feed the bread to the slicing blades.

3. A bread slicing machine comprising a housing, a pair of rectangular frames mounted therein and spaced apart, each frame having a series of slicing blades mounted therein with the cutting edges of the blades adapted to travel substantially in a single plane, guide rolls pivotally mounted within the housing and extending between the rectangular frames, means adapted to keep the frames at substantially a fixed distance apart, connected depending arms integrally united to the frames at an angle to the planes thereof and adapted to drive them reciprocatingly in alternation, a rocker assembly pivotally mounted in the housing below the frames and having rocker arms formed at each end thereof, the outer ends of which rocker arms are pivotally united to the lower ends of the depending arms, and means to reciprocate the rocker arms in unison.

4. A bread slicing machine comprising a housing, a pair of rectangular frames mounted therein and spaced apart, each frame having a series of slicing blades mounted therein with the cutting edges of the blades adapted to travel substantially in a single plane, guide rolls pivotally mounted within the housing and extending between the rectangular frames, means adapted to keep the frames at substantially a fixed distance apart, connected depending arms integrally united to the frames at an angle to the planes thereof and adapted to drive them reciprocatingly in alternation, a rocker assembly pivotally mounted in the housing below the frames and having rocker arms formed at each end thereof, the outer ends of which rocker arms are pivotally united to the lower ends of the depending arms, and means to reciprocate the rocker arms in unison, the length and travel of the rocker arms and the length of the frames and depending arms being so proportioned that there will be little variance in the planes of travel of the lower ends of the respective series of blades.

5. A bread slicing machine comprising a housing, a pair of rectangular frames mounted therein, each frame having a series of slicing blades mounted therein with the cutting edges of the blades adapted to travel substantially in a single plane guide rolls pivotally mounted and extending between the rectangular frames, resilient means connecting the frames and adapted to exert a constant traction thereon towards each other, operative means connected to the frames adapted to drive them reciprocatingly in alternation and means to feed the bread to the slicing blades.

6. A bread slicing machine comprising a housing, a pair of rectangular frames mounted therein, each frame having a series of slicing blades mounted therein, guide rolls pivotally mounted within the housing and extending between the rectangular frames, resilient means attached to the frames, adapted to exert a constant traction thereon to keep them in continuous contact with the guide rolls, operative means connected to the frames adapted to drive them reciprocatingly in alternation and means to feed the bread to the slicing blades.

7. A bread slicing machine comprising a housing, a rectangular frame mounted therein, said frame having a series of slicing blades mounted therein, guide rolls pivotally mounted within the housing in contact with the rectangular frame, resilient means attached to the frame adapted to exert a constant traction thereon to keep it in continuous contact with the guide rolls, operative means connected to the frame adapted to drive it reciprocatingly and means to feed the bread to the slicing blades.

8. A bread slicing machine comprising a housing, a pair of blade-carrying frames mounted therein, each frame having a series of slicing blades mounted therein, guides mounted within the housing and extending between the rectangular frames, adapted to keep the frames at a fixed distance apart, resilient means acting upon the frames adapted to keep given faces of the frames in constant contact with the guides, operative means connected to the frames adapted to drive them reciprocatingly in alternation, feed and discharge openings in the housing, an inclined bread chute extending through said openings sloping downwardly from rear to front and having a transverse gap through which the slicing blades travel and rotatable means united to the bread chute extending between the blades adapted to support the bread while being sliced.

9. A bread slicing machine comprising a housing, a pair of blade-carrying frames mounted therein, each frame having a series of slicing blades mounted therein, guides mounted within the housing and extending between the rectangular frames, adapted to keep the frames at a fixed distance apart, resilient means acting upon the frames adapted to keep given faces of the frames in constant contact with the guides, operative means connected to the frames adapted to drive them reciprocatingly in alternation, feed and discharge openings in the housing, an inclined bread chute extending through said openings sloping downwardly from rear to front and having a transverse gap through which the slicing blades travel, and a roll rotatably mounted in said gap adapted to support and carry forward the bread while being sliced and having parallel spaced slots formed therein in which the blades may travel.

10. A bread slicing machine comprising a housing, a pair of blade-carrying frames mounted therein, each frame having a series of slicing blades mounted therein, guides mounted within the housing and extending between the rectangular frames, adapted to keep the frames at a fixed distance apart, resilient means acting upon the frames adapted to keep given faces of the frames in constant contact with the guides, operative means connected to the frames adapted to drive them reciprocatingly in alternation, feed and discharge openings in the housings, and an inclined bread chute extending through said openings sloping downwardly from rear to front and having a transverse gap through which the slicing blades travel, said bread chute comprising an upper section located above the slicing blades and a lower section below the slicing blades, said sections being separately removable, fingers united to one of said sections extending between the slicing blades and carrying rolls adapted to support and facilitate the bread while being sliced.

11. A bread slicing machine comprising a housing, a pair of opposed rectangular blade-carrying frames mounted therein, upper and lower guide rolls mounted within the housing between the opposed frames and at each side thereof adapted to bear against and to keep the frames in adjacent parallel planes, operative means connected to the frames adapted to drive them reciprocatingly in alternation and resilient means united to the frames and the housing adapted to exert a constant traction on the frames in the line of their travel.

12. A bread slicing machine comprising a housing, a pair of blade-carrying frames mounted therein, each frame having a series of slicing blades mounted therein, operative means connected to the frames adapted to drive them reciprocatingly in alternation, feed and discharge openings in the housing, an inclined bread chute extending through said openings sloping downwardly from rear to front and having a transverse gap through which the slicing blades travel, and a rotatable grooved roll mounted in the bread chute extending between the blades with its periphery positioned to contact and support the bread while being sliced.

13. In a bread slicing machine, a housing, supporting means mounted therein, a plurality of slicing blades mounted upon the supporting means, operative means connected to and adapted to drive the supporting means and the slicing blades, an inclined bread chute sloping downwardly to and beyond the slicing blades, a gap formed in said chute adapted to permit travel of the slicing blades therethrough, and a rotatable grooved roll mounted within the housing and having its periphery between the grooves extending between the slicing blades and adapted to contact with and to support and carry forward the bread while being sliced.

14. In a bread slicing machine the combination with a housing, of a pair of opposed frames mounted therein, each frame having a series of slicing blades mounted therein with the cutting edges of the blades adapted to travel substantially in a single plane, guides mounted within the housing and extending between the frames near the upper and lower ends thereof, adapted to keep the frames at a fixed distance apart, resilient means having their opposite ends attached to the opposed frames respectively adapted to exert a constant traction thereon and keep the frames in contact with the guides, operative means connected to the frame adapted to drive them reciprocatingly in alternation and means to feed the bread to the slicing blades.

15. A bread slicing machine comprising a housing, a pair of blade-carrying frames mounted therein, each frame having a series of slicing blades mounted therein, upper and lower guide rolls mounted within the housing and extending between the rectangular frames at both sides thereof and adapted to keep the frames at a fixed distance apart, a plurality of tension springs having their opposite ends united to the frames respectively and adapted to keep the inner faces of the frames in constant contact with the guide rolls, operative means connected to the frames adapted to drive them reciprocatingly in alternation, feed and discharge openings in the housing, and an inclined bread chute extending through said openings sloping downwardly from rear to front and having a transverse gap through which the slicing blades travel, said bread chute comprising an upper section located above the slicing blades and a lower section below the slicing blades said sections being separately removable.

16. In a bread slicing machine the combination with a housing, of a pair of opposed rectangular blade-carrying frames mounted therein, upper and lower guide rolls mounted within the housing between the opposed frames at each side thereof adapted to bear against and to keep the frames in adjacent parallel planes, operative means connected to the frames adapted to drive them reciprocatingly in alternation, and tension springs having their ends united to the opposed rectangular frames respectively adapted to hold the opposed frames in constant contact with the guide rolls.

17. In a bread slicing machine, a housing, a pair of rectangular frames, a series of slicing blades mounted in each frame, each frame having a pair of spaced arms integral therewith and extending downwardly in the general direction of travel thereof but at an angle to the planes of the frames, the lower ends of the arms being pivotally attached to rocker-arm driving means, guide rolls mounted within the housing and extending between the rectangular frames at each side thereof, tension springs having their ends united to the opposed rectangular frames respectively adapted to hold the opposed frames in constant contact with the guide rolls, operative means connected to the arms adapted to drive the frames reciprocatingly in alternation, and means to feed the bread to the slicing blades.

HARRY J. CRINER.